United States Patent
Fang et al.

(10) Patent No.: US 7,218,608 B1
(45) Date of Patent: May 15, 2007

(54) RANDOM EARLY DETECTION ALGORITHM USING AN INDICATOR BIT TO DETECT CONGESTION IN A COMPUTER NETWORK

(75) Inventors: Chien Fang, Danville, CA (US); Hiroshi Suzuki, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1053 days.

(21) Appl. No.: 09/921,078

(22) Filed: Aug. 2, 2001

(51) Int. Cl.
*G01R 31/08* (2006.01)

(52) U.S. Cl. .................. 370/229; 370/395.4; 370/412; 370/468

(58) Field of Classification Search ................. 370/412, 370/468, 229, 230, 230.1, 235, 395.4
See application file for complete search history.

(56) References Cited

U.S. PATENT DOCUMENTS

| | | | |
|---|---|---|---|
| 5,602,830 A | 2/1997 | Fichou et al. | |
| 5,768,273 A | 6/1998 | Aznar et al. | |
| 5,818,815 A | 10/1998 | Carpentier et al. | |
| 5,864,539 A * | 1/1999 | Yin .............................. | 370/236 |
| 6,011,776 A | 1/2000 | Berthaud et al. | |
| 6,011,804 A | 1/2000 | Bertin et al. | |
| 6,034,945 A | 3/2000 | Hughes et al. | |
| 6,069,872 A * | 5/2000 | Bonomi et al. ............. | 370/236 |
| 6,072,773 A | 6/2000 | Fichou et al. | |
| 6,075,769 A | 6/2000 | Ghanwani et al. | |
| 6,141,323 A * | 10/2000 | Rusu et al. .................. | 370/236 |
| 6,157,613 A * | 12/2000 | Watanabe et al. ........... | 370/229 |
| 6,167,445 A | 12/2000 | Gai et al. | |
| 6,175,570 B1 | 1/2001 | Cukier et al. | |
| 6,212,181 B1 | 4/2001 | Divivier et al. | |
| 6,256,309 B1 | 7/2001 | Daley et al. | |
| 6,286,052 B1 | 9/2001 | McCloghrie et al. | |
| 6,333,917 B1 * | 12/2001 | Lyon et al. .................. | 370/236 |

OTHER PUBLICATIONS

U.S. Appl. No. 09/693,419, Chien Fang and Hiroshi Suzuki.
Floyd, S. and Jacobson, V., Random Early Detection, V., to appear in IEEE/ACM Transactions on Networking, Aug. 1993, pp. 1-22.
Jacobson, V., Nichols, K., and Poduri, K., Red in a Different Light, draft of Sep. 30, 1999, pp. 1-38.

* cited by examiner

*Primary Examiner*—Chau Nguyen
*Assistant Examiner*—Jung Park
(74) *Attorney, Agent, or Firm*—Cesari and McKenna LLP

(57) ABSTRACT

A switching fabric sets a congestion indicator bit (EFCI bit) in an ATM cell if any queue through which the ATM cell passes is filled above a lower threshold. A Traffic Manager monitors the field of the EFCI bit as cells arrive at an output port of the switching fabric. The traffic manager periodically calculates the ratio of ATM cells having the EFCI congestion bit set to all ATM cells routed to a particular output port. The periodically calculated ratio is used as an input parameter to a Random Early Detection (RED) algorithm. The RED algorithm selects a cell for the switch fabric to drop, by use of a random selection method. The destination computer then does not receive the packet since cells forming part of the packet have been discarded.

33 Claims, 14 Drawing Sheets

SWITCH FABRIC WITH LINECARDS, QUEUES AND THRESHOLDS

LINECARD WITH LOGIC CIRCUITS FOR EXECUTING RED ALGORITHM, RAM MEMORY FOR STORING DATA

ATM CELL STRUCTURE

ATM CELL HEADER

TOPOLOGY FOR RED SIMULATIONS

RESULTS FOR EPD-THRESHOLD = 300, 900

RED: 3x10 TCPs (RTT = 50ms)
Qth=100/300; MAXP=0.01; FREEZE=100ms;
THRUPUT=128.7 Mbps

RESULTS FOR EFCI-THRESHOLD = 100,
EPD = 300

RESULTS FOR EFCI-THRESHOLD = 300, EPD = 900

RESULTS FOR PD UPDATE INTERVAL = 200 msec

RED: 10/20 (Hi/Lo) TCPs (RTT = 50ms)
PER-CLASS VS. PER-CLASS PER-PREF RATIOS; MAXP=1.0/2.0%

TIME (msec)

PER-CLASS VS. PER-CLASS PER-PREFERENCE Ne/Nt

RANDOM EARLY DETECTION ALGORITHM USING AN INDICATOR BIT TO DETECT CONGESTION IN A COMPUTER NETWORK

RELATED CASES

This patent is related to U.S. patent Ser. No. 09/693,419, filed on Oct. 20, 2000, now issued as U.S. Pat. No. 6,888,824, titled Random Early Detection (RED)Algorithm Using Marked Segments to Detect Congestion in a Computer Network, all disclosures of which are incorporated herein by reference.

BACKGROUND OF THE INVENTION

1. Field of the Invention

This invention relates to operation of network switches under traffic overload conditions, and in particular to dropping of packets as a switch becomes congested.

2. Background Information

Modern computer networks are often designed using the TCP/IP protocol to transfer data packets between end stations. The TCP/IP packets transferred between end stations are often converted to fixed length packets for transfer over a trunk line within the computer network, for example ATM networks are often used as trunk lines in the computer network. The ATM portion of the network uses switches designed to switch ATM cells. Congestion of cell traffic within an ATM switch may develop when the network carries a heavy traffic load.

A switch, for example an ATM switch, is often designed with linecards attaching to the external computer network, and attaching to a "switching fabric" within the switch. The switching fabric, such as an ATM switching fabric, is often implemented in a few computer chips. The computer chips have an internal structure which is not available to the switch designer. The switch designer only has control of the input and output parameters of a switch so that a route from an input linecard to an output linecard may be built through the switch for each cell as it arrives at the switch, and the switch designer has no control or access to the internal structure of the switching fabric chips.

The internal structure of the switching fabric maintains queues of cells as they await the various operations needed to operate the switching fabric. When congestion develops in the switch, these queues may fill so that there is no room to store the next arriving cell. The next arriving cell is then dropped. A lost cell in the switching fabric causes loss of a TCP/IP packet at the point in the network where the TCP/IP packets are re-assembled from the ATM cells. A lost TCP/IP packet causes the TCP/IP protocol to respond, first by re-transmitting the lost packet, and second by reducing the transmission rate of the transmitter. When many end stations are transmitting packets which contribute to the cell overflow in the switch, then packets from all of the end stations may be dropped by the switch at about the same time. The transmitters then begin re-transmitting the lost packets at about the same time. This retransmission at about the same time leads to unwanted synchronization between transmitting stations of the computer network.

Unwanted synchronization of a computer network due to loss of packets at a congested switch has been reduced by randomly dropping packets in the traffic stream using an algorithm referred to as the Random Early Detection (RED) algorithm. The RED algorithm is described by S. Floyd and V. Jacobson in their paper "*Random Early Detection Gateways for Congestion Avoidance*" published in the IEEE/ACM Transactions on Networking, Vi, N4, pp. 397–412, in August 1993, all disclosures of which are incorporated herein by reference. Also, further features of the RED algorithm are described in the paper by V. Jacobson, K. Nichols, K. Poduri, titled "*RED in A New Light*", unpublished but widely circulated, all disclosures of which are incorporated herein by reference. The RED algorithm uses lengths of queues within the switching fabric as input parameters to the RED algorithm.

However, when a switching fabric is implemented in a set of commercial computer chips, the queues within the switching fabric are not available to the switch designer. The switch designer then cannot implement the RED algorithm.

There is needed an improved method for handling lost ATM cells, and lost packets, in a switch of a computer network.

SUMMARY OF THE INVENTION

The invention is to use the ability of a switching fabric to set a congestion indicator bit in an ATM cell if any queue through which the ATM cell passes is filled above a lower threshold. The lower threshold is set, for example, as part of the boot-up sequence of the network device. The Traffic Manager monitors the field of the congestion indicator bit as ATM cells arrive at the switching fabric. The Traffic Manager periodically calculates the ratio of ATM cells having the congestion bit set to all ATM cells routed to a particular port. The periodically calculated ratio is used as an input parameter to a Random Early Detection (RED) algorithm. The RED algorithm selects a packet for the switch fabric to drop, by use of a random selection method. The destination computer then does not receive the packet since the output linecard does not transmit a dropped packet. In an adaptable protocol such as TCP/IP, the source station resends the packet in response to its timer timing out as it waits for an ACK message, and also the source computer reduces the rate at which it transmits packets into the network. The random selection of ATM cells to drop has the effect of helping to prevent undesirable network synchronization of transmission of replacement packets. The lower threshold is set to a low value, for example at 10% to 50% of the capacity of the queue, so that the buffers remain about 50% or more empty. This choice for the lower threshold permits the buffers to absorb a burst of ATM cells resulting from a burst of packets reaching the network device. With adaptive source computers, the network device then does not reach a congested state, thereby maintaining optimum throughput for the computer network. The Explicit Forward Congestion Indication Field (EFCI bit) of an ATM cell is used to mark a cell which has passed through a queue which is filled above a lower threshold level. Cells destined for the output port with the EFCI bit set are then counted by the Traffic Manager, and this count is used in the periodic calculation of the ratio used as input to the RED algorithm. ATM cells received by the input linecard which already have their EFCI bit set are properly counted by the RED algorithm of the present invention, as they are candidates for random dropping due to congestion in an upstream network device.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION OF AN ILLUSTRATIVE EMBODIMENT

Figure 1:
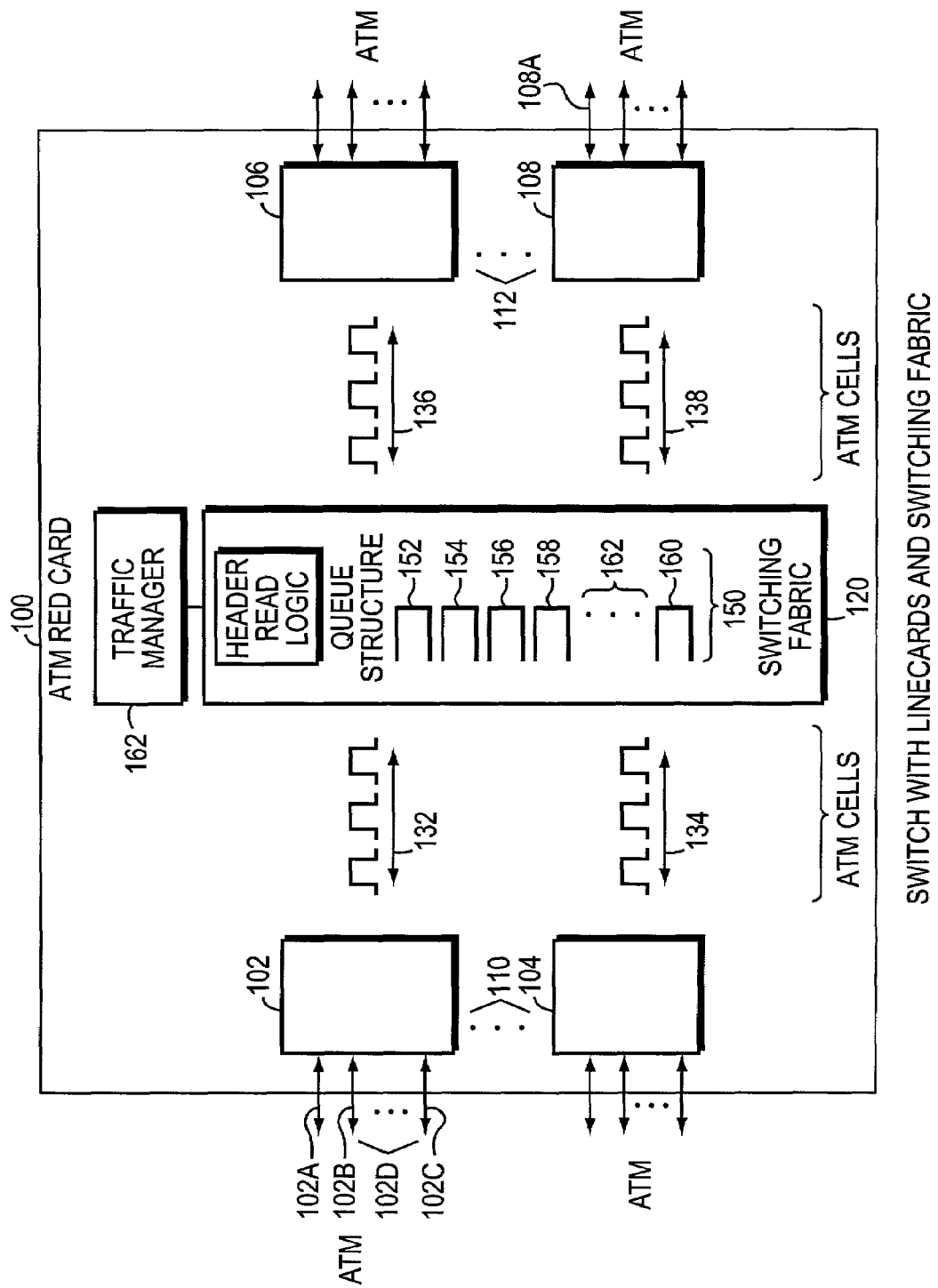
FIG. 1 is a block diagram of a switch with linecards, in accordance with the invention.

Turning now to FIG. 1, switch 100 is shown. Switch 100 has linecards 102, 104, 106, 108, etc. Three dots 110 and also three dots 112 indicate that a large number of linecards may be installed in switch 100.

The linecards 102, . . . 108 are each connected to a plurality of Asynchronous Transfer Mode (ATM) computer network links. For example, the ATM computer network links connected to linecard 102 are shown as link 102A, 102B, 102C. Three dots 102D indicate that a large number of ATM computer links may be connected to any linecard, for example linecard 102.

The linecards 102, 104, 106, 108, etc. each connect to switching fabric 120. Switching fabric 120 receives ATM data cells from an input linecard and switches the ATM data cells to an appropriate output linecard. For example, ATM data cells may arrive on computer link 102A addressed to a destination computer which is reached through computer link 108A. These ATM data cells are forwarded by linecard 102 to switching fabric 120, and switching fabric 120 switches the ATM data cells to linecard 108. The ATM data cells then exit switch 100 through computer link 108A.

Switching fabric 120 contains a queue structure 150. Individual queues of queue structure 150 are shown as queue 152, 154, 156, 158, 160, etc. Three dots 162 indicate there may be a large plurality of queues in queue structure 150. The queues represent is memory structures within switching fabric 120 in which ATM data cells are queued up as they pass through the switching fabric 120.

ATM data cells are represented by data structures 132, 134, 136, and 138. Data structures 132, 124, 136, and 138 represent the ATM data cells transferred between the linecards and the switching fabric. For example, data structures 132 represent ATM data cells being transferred between linecard 102 and switching fabric 120, etc. That is, linecards 102, 104, 106, 108 receive ATM data cells from external computer network links, and exchange ATM cells with the switching fabric 120. ATM cells are described in greater detail with reference to FIG. 6 and FIG. 7.

Header read logic 160 reads selected header fields of the ATM cells. The header fields may be read as the cells are received at an input port, or the headers may be read as the cells arrive at an output port.

Information read from the header fields of the ATM cells is transferred to Traffic Manager 162. Traffic manager 162 can then perform logic decisions based upon the information supplied by header read logic 160, on an ATM data cell by ATM data cell basis. As described hereinbelow in greater detail, the traffic manager 162 calculates the ratio of ATM cells received by an output port which have their Explicit Forward Congestion Indication Field (EFCI bit) "set" to the total number of ATM cells received by that port, during a selected time period. The ratio "R" is then used to make a decision as to whether or not the ATM cell should be discarded, as explained further hereinbelow. Both header read logic 160 and traffic manager 162 may be implemented in ASIC chips. An implementation in ASIC chips yields a logic circuit for header read logic 160 which is fast enough to read header fields as an ATM cell passes through the circuit, without appreciable delay of the ATM data cell. Also, an ASIC implementation of traffic manager 162 is fast enough to make decisions as to whether or not an ATM data cell should, or should not, be discarded without appreciable delay as the data cell passes by header read logic 160. The Traffic Manager 160 can be part of the switch fabric card, or it can be a separate card dedicated to the logic calculations of the present invention.

Figure 2:
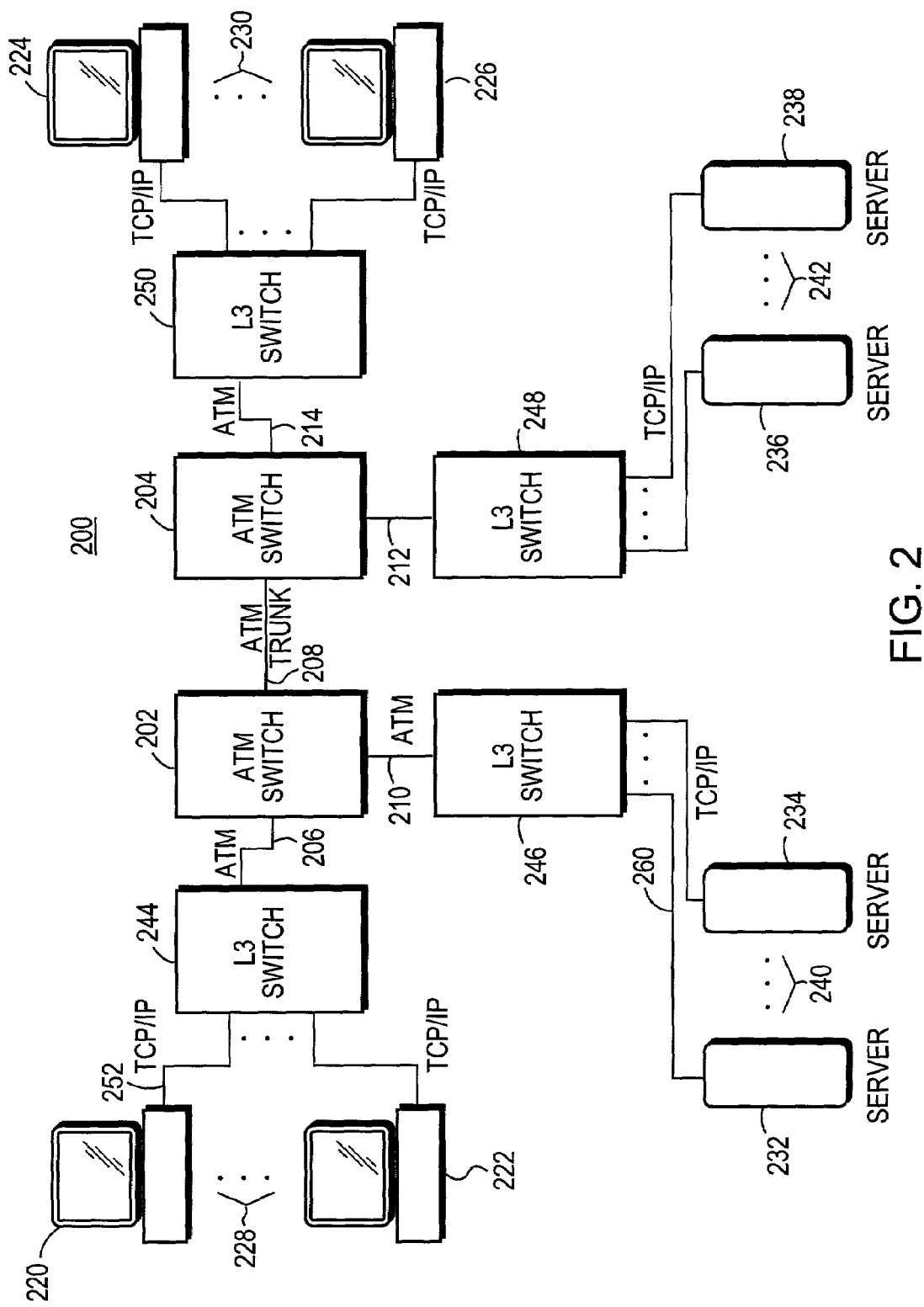
FIG. 2 is a block diagram of a computer network in accordance with the invention.

Turning now to FIG. 2, a representative computer network 200 using switch 100 is shown. Switch 202 and switch 204 are designed with the structure shown in switch 100. ATM cells travelling on link 206, for example, are switched by switch 202 to various outgoing links, for example, link 208 and link 210. At switch 204, ATM cells are received on link 208, and switched to various outgoing ATM network links, for example link 212 and link 214.

Network 200 comprises end stations 220, 222, 224, 226, etc. For example, three dots 228 and three dots 230 indicate that a large number of end stations may be accommodated by computer network 200. End stations 220, 222, 224, 226 are indicated as, for example, desktop computers through which individuals communicate. Additional end stations having a server function are shown as end stations 232, 234, 236, 238, etc. Three dots 240, and 242 indicate that a large number of servers may be accommodated by computer network 200. The end stations transfer data therebetween by use of the TCP/IP protocol. The TCP/IP protocol data packets are converted to ATM cells by gateway switches 244, 246, 248, 250, etc. Further, ATM cells received by gateway switches 244, 246, 248, 250 are converted into TCP/IP data packets before being transferred to the computer links connecting to the end stations.

In operation, for example, data packets transmitted by end station 220 travel on computer link 252 to switch 244. At switch 244 the TCP/IP data packets received from link 252 are converted into ATM cells and forwarded onto network link 206. The ATM cells are received from network link 206 by ATM switch 202. ATM switch 202, for example constructed in accordance with the block diagram of FIG. 1, switches the incoming ATM cells received from network link 206 to the appropriate outgoing network link. For example, in the event that a user of end station 220 were sending e-mail to a person using end station 224, the ATM cells of the e-mail message are transferred out from ATM switch 202 through computer link 208. In the alternative event that the user of computer 220 were logging into a web page maintained on server 232, then the ATM cells of that log in would be transferred by ATM switch 202 to network link 210. From network link 210 the ATM cells would be transferred to switch 246, reassembled into TCP/IP data packets and forwarded on network link 260 to server 232. Return traffic from any receiving end station travels in substantially the reverse direction and also passes through ATM switch 202, ATM switch 204, etc. ATM trunk 208 is often employed in computer network design as a link between widely separated switches, for example ATM switch 202 and ATM switch 204. For example, ATM trunk 208 may be a link across a continent, for example, from Boston to San Francisco, etc.

Figure 3:
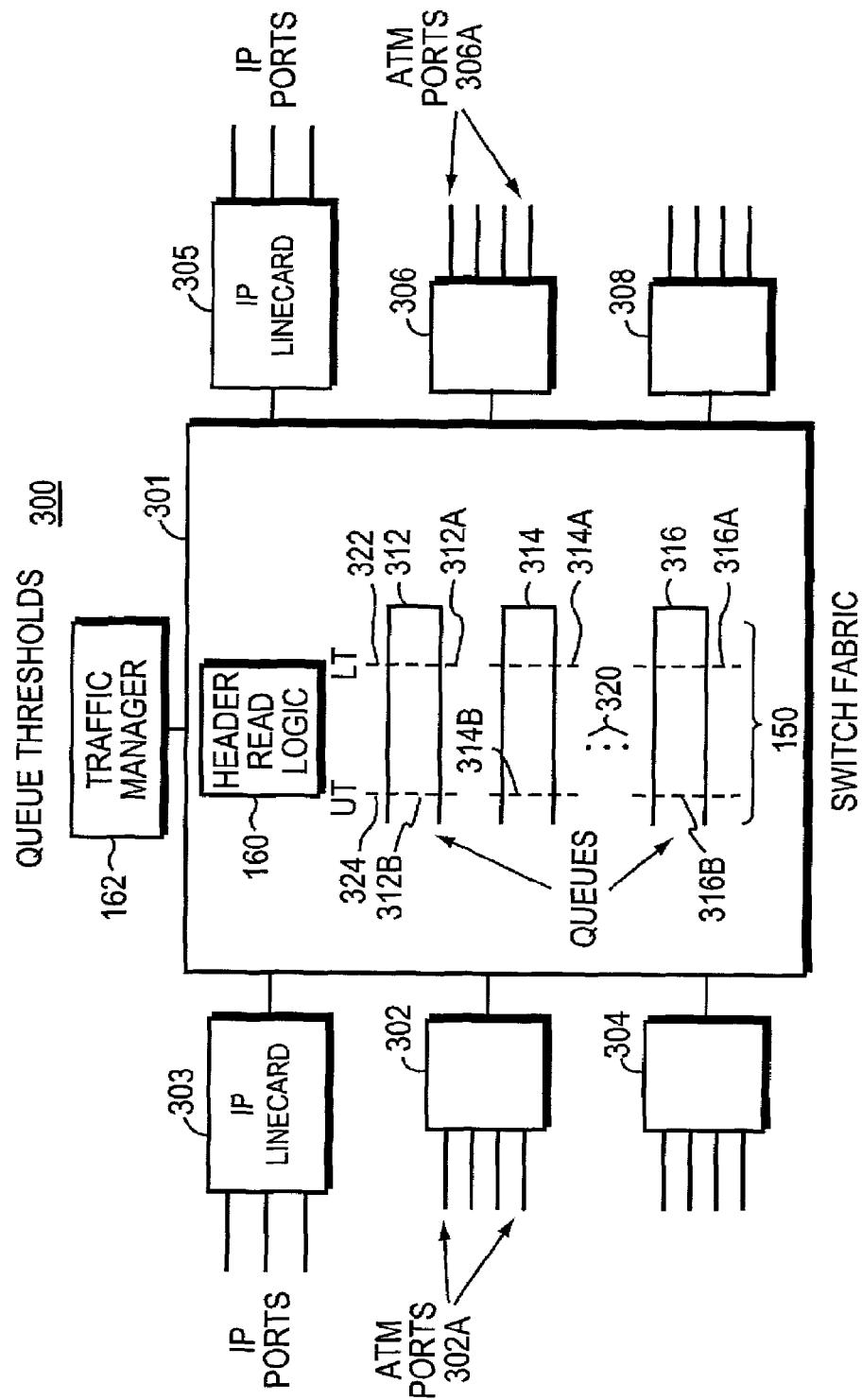
FIG. 3 is a block diagram of a switch fabric with queues, in accordance with the invention.

Turning now to FIG. 3, the internal queue structure 150 of switch 100 is shown in greater detail. In particular, the queues are shown as having a lower threshold and having an upper threshold. If a queue is filled above a lower threshold, then the ATM cells have a bit set to indicate that the queues are filled above the lower threshold. In the event that the queue is filled above the upper threshold, the cells are dropped by the switch. The upper threshold may be the maximum number of cells which a queue may accommodate, or may simply be the maximum limit of physical memory allocated to the queue, etc.

More particularly, switch 300 represents ATM switch 100, or ATM switch 202, or ATM switch 204, etc. Linecards 302, 304, 306, 308, etc. represent the plurality of linecards serviced by switch fabric 301. ATM Network links connect through ports 302A to linecard 302. Further, network links connect through ports 306A to linecard 306, etc. ATM cells received through any of ports 302A or ports 306A are switched by switch fabric 301. Intermediate operations during switching by switch fabric 301 require that the ATM cells be maintained in queues 312, 314, 316, etc. Three dots 320 indicate that a plurality of queues may be utilized within switch fabric 301.

Linecards 303, 305, etc. represent linecards which receive TCP/IP packets from external computer network links. The TCP/IP packets are converted by the linecards into ATM cells. The linecards then forward the ATM cells to switching fabric 120 for switching to the desired output port. These ATM cells are received by a TCP/IP linecard and are then re-converted into TCP/IP data packets before being forwarded onto external computer links. In this case, where TCP/IP packets are received from and transmitted onto external computer network links, the linecards and the switching fabric 120, 301, exchange ATM data cells 132, 134, 136, 138, etc. Alternatively, ATM cells forwarded by linecards 303, 305, etc. to switching fabric 301 may be switched to any ATM cell output port.

Lower threshold 312A and upper threshold 312B are implemented for queue 312. Also lower threshold 314A and upper threshold 314B are implemented for queue 314. Further, lower threshold 316A and upper threshold 316B are implemented for queue 316, etc. That is, each queue of queues 150 have an assigned lower threshold and an assigned upper threshold. Dashed lines 322 indicate the lower threshold (LT) for the various queues. Dashed lines 324 indicate the upper thresholds (UT) for the various queues.

Figure 4:
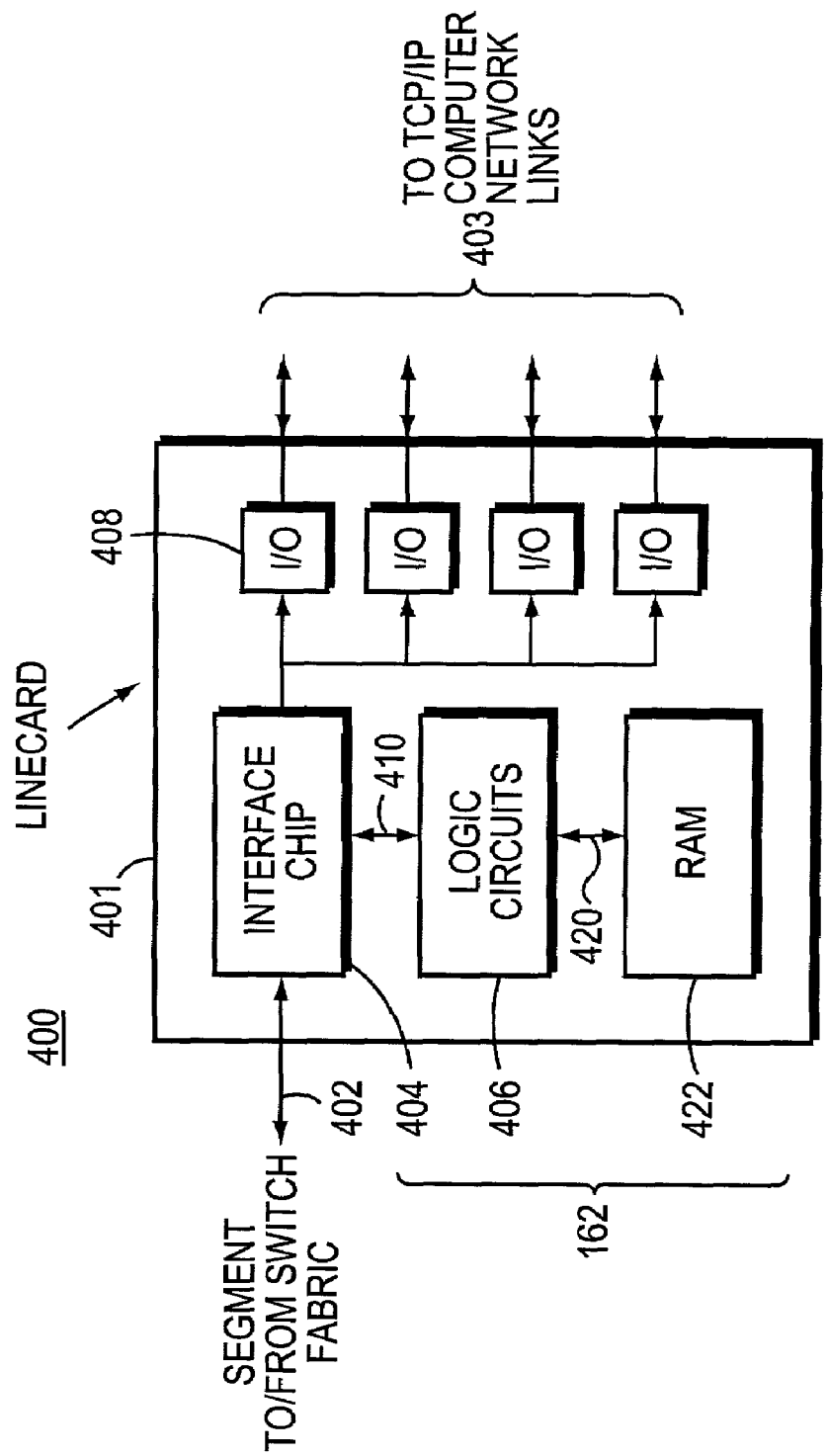
FIG. 4 is a block diagram of a linecard, in accordance with the invention.

Turning now to FIG. 4, an alternative embodiment of the invention is shown for IP linecard 303, 305 as linecard 400. Linecard 400 receives or transmits TCP/IP data packets through IO ports 408. Interface chip 404 converts IP packets to Fixed Length Segments when I/O port 408 is receiving a TCP/IP packet from TCP/IP computer link 403, and transmits the Fixed Length Segments to switch fabric through line 402. The switching fabric then switches the Fixed Length Segments. Alternatively, interface chip 404 assembles Fixed Length Segments into TCP/IP data packets when Fixed Length Segments are received from the switch fabric along line 402, and then transmits the TCP/IP data packets out through an I/O port 408 to a TCP/IP computer link 403. Interface chip 404 also reads header fields of Fixed Length Segments received from the switch fabric along line 402, and transmits the information read to logic circuits 406. Logic circuits 406 communicate with RAM 422 through link 420 to perform the function of traffic manager 162. In a further embodiment of the invention, the RED algorithm calculation may be done in a traffic manager 162 rather than in line cards.

In an alternative embodiment of the invention, the Fixed Length Segments may be packet segments of convenient length, for example, 128 bytes, 256 bytes, 512 bytes, etc. In a still further embodiment of the invention, the Fixed Length Segments may be ATM cells.

Figure 5:
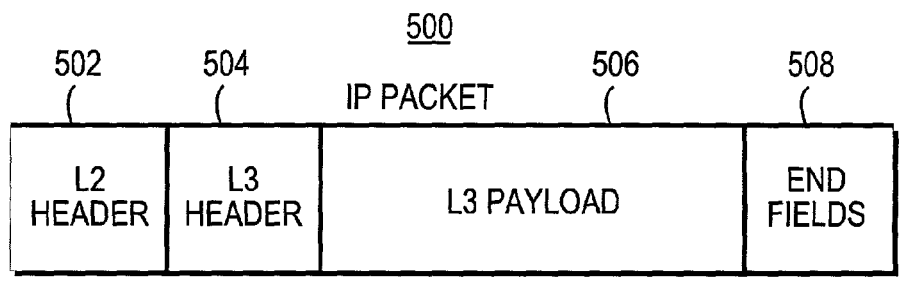
FIG. 5 is a block diagram of a TCP/IP data packet.

Turning now to FIG. 5, a typical format of an IP packet is shown as packet 500. Packet 500 has a Layer 2 header 502. Packet 500 has a Layer 3 header 504. Also, packet 500 has a Layer 3 payload 506. In FIG. 5 the Layer 2 header 502 is indicated by "L2" header. The Layer 3 header 504 is indicated as the "L3" header, etc. Finally, IP packet 500 has end fields 508, including a cyclic redundancy check field. An IP packet such as IP packet 500 may typically be on the order of 1500 bytes in length.

Figure 6:
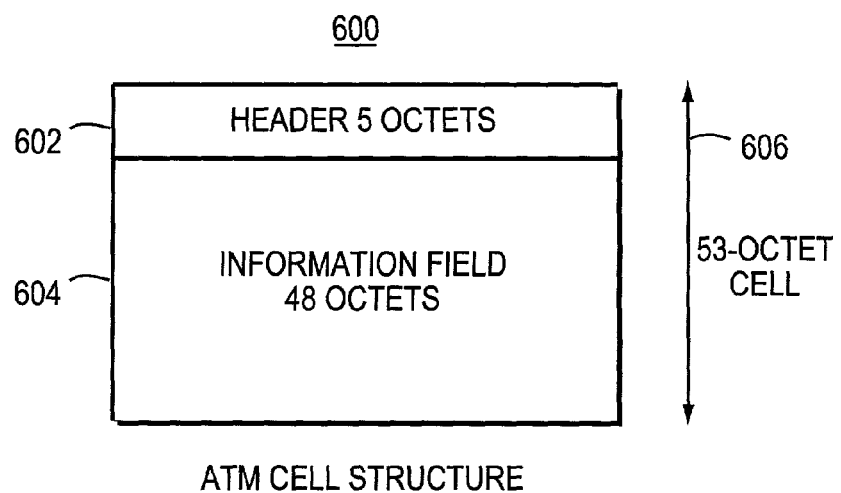
FIG. 6 is a block diagram of an ATM cell.

Turning now to FIG. 6, a typical ATM cell 600 is shown. The ATM cell 600 has header fields 602 and information field 604. The header field is 5 octets in length. An "octet" and a "byte" are synonyms. An octet, or byte is 8 bits in length, in the present exemplary embodiment of the invention. Arrow 606 indicates that ATM cell 600 is 53 octets in length. The header field 602 is 5 octets in length. Therefore, the information field 604 is 48 octets in length.

Figure 7:
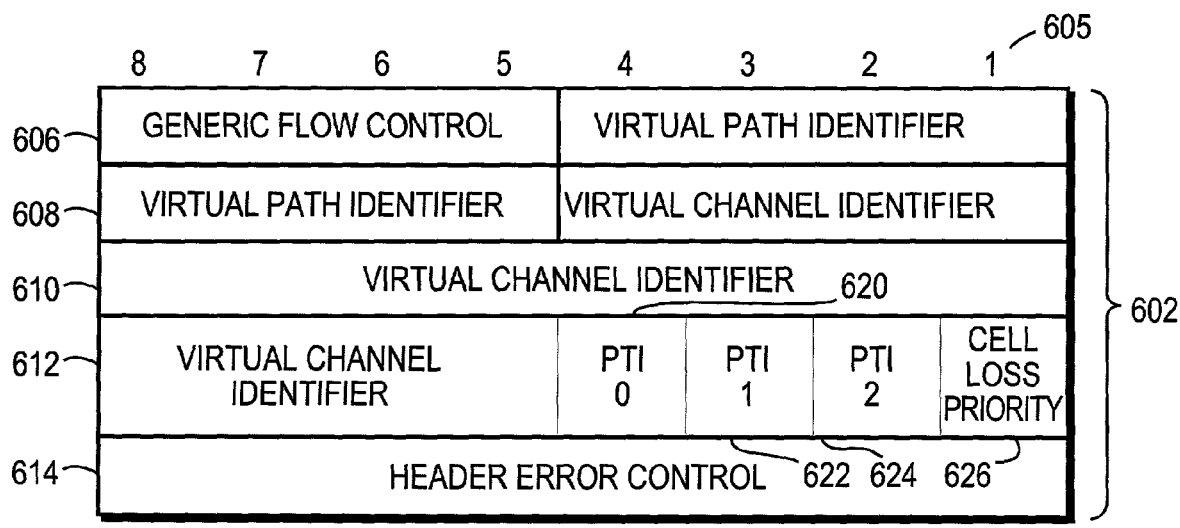
FIG. 7 is a block diagram of an ATM cell header.

Turning now to FIG. 7, the five (5) octets of the ATM cell header fields 602 are shown. The bits of the field are shown by numbers 605.

Byte one (1) 606 contains a "generic flow control field utilizing bits 8, 7, 6, and 5. Also, byte one (1) 606 has a "virtual path identifier" field using bits 4, 3, 2, and 1. Byte two (2) 608 has a continuation of the "virtual path identifier" field using bits 8, 7, 6, and 5. Also, byte (2) 608 has a "virtual channel identifier" field using bits 4, 3, 2, and 1. Byte three (3) 610 continues the "virtual channel identifier" field utilizing all 8 bits of that field.

Byte four (4) 612 contains a continuation of the "virtual channel identifier" field utilizing bits 8, 7, 6, and 5. Byte four (4) 612 has a three (3) bit field referred to as the "pay load type indicator" field (PTI field), utilizing bits 4, 3, and 2. Finally, byte four (4) 612 has a "ATM cell loss priority" field 626 utilizing only one bit, bit 1.

Byte five (5) 614 has a "header error control" field utilizing all 8 bits.

The bits of the payload type indicator (PTI) field in byte four (4) 612 are next discussed. PTI 0 bit in field 620 at bit position "4" indicates if the ATM cell is a user data cell (0), or an "OAM" cell (1). An OAM cell refers to the cell being an Operations, Administration, or Management cell, that is not a data cell.

PTI 1 bit in field 622 at the bit 3 position indicates whether or not a queue through which the ATM cell passed in the switch fabric is filled beyond its lower threshold, with a value "1" indicating that some queue in the switch fabric through which the ATM data cell passed is filled beyond the lower threshold, and a value "0" indicating that none of the internal queues the ATM data cell passed through were filled beyond their lower threshold value. The PTI 1 bit of an ATM data cell is also called the Explicit Forward Congestion Indication Field (EFCI bit), as noted hereinabove. An ATM data cell having the PTI 1 bit in field 622 logically "set", usually having a value of "1", is referred to as a "marked" ATM cell, or as an "EFCI marked" ATM cell as described with reference to FIG. 3 hereinabove.

Bit PTI 2 in field 624 indicates whether the ATM data cell is the last ATM data cell of a packet (1), or not (0).

The bit PTI 1 in field 622 of a data cell is utilized in the present invention to indicate whether or not a queue within the switch fabric was filled beyond the lower threshold value. For example, internal queues of the switching fabric are indicated as queues 150, that is queue 152, 154, 156, 158, 160, etc., and the additional plurality of queues three dots 162. Also in FIG. 3, queue 312 is shown having lower threshold 312A. Queue 314 is shown having lower threshold 314A. Queue 316 is shown having lower threshold 316A. The switch fabric is designed so that if a data cell passing through the switching fabric passes through an internal queue filled above its lower threshold value, then the PTI 1 bit in field 622 is set to the value "1".

In operation, and in the event that an input ATM cell arriving from the network at an input linecard has its PTI 1 bit set to "0", that data cell will continue to have its PTI 1 bit set to "0" as it enters the switch fabric. In the event that the cell passes through a queue of the switch filled above the queue lower threshold value 312A, 314A, 316A, etc., the PTI 1 bit of the data cell is set to the value "1" by the switch fabric.

Further, in operation and in the event that an input ATM cell to the input linecard has its PTI 1 bit set to "1", the PTI 1 bit will not be changed by the input line card. Thus, the ATM cell will have its PTI 1 bit set to "1" when it enters the switch fabric. The switch fabric will not set the PTI 1 bit to a value of "0", and so this particular ATM cell will exit from the switch fabric with its PT 1 bit set to "1". Arrival of an ATM cell having its PTI 1 bit set to "1 " will affect the later processing as the Traffic Manager counts the number of cells having their PTI 1 bits set to "1". However, this addition of cells arriving at the switch with their PTI 1 bits set to "1" will not change the results of the overall operation of the response of the network to counting ATM cells having the PTI 1 bit set to the value of "1", for two reasons. The first reason is that the cell is indicating that an earlier ATM switch set the PTI 1 bit, also known as the EFCI bit, to a value of "1", indicating that a switch upstream from the receiving switch may be experiencing congestion. In that event a cell should be dropped in order to slow down the TCP/IP sending end station so as to avoid further congestion. The second reason is that under normal network design it is not expected that many ATM cells will arrive at a switch having their PTI 1 bits set to "1", and so counting these cells will make only a small contribution to the total number of ATM cells having their PTI 1 bits set to a value of "1" as counted by the Traffic Manager for the outgoing port.

An ATM cell which is "marked" for the purpose of the present exemplary embodiment of the invention is a cell having the two left most bits in the PTI field have the value "01". The PTI0 field 620 value of "0" indicates that the cell is a user data cell. The PTI 1 field 622 value "1" indicates that a queue through which the ATM cell has passed is in the internal structure of the switching fabric 120 is filled above its lower threshold value, 312A, 314A, 316A, etc.

Figure 8A:
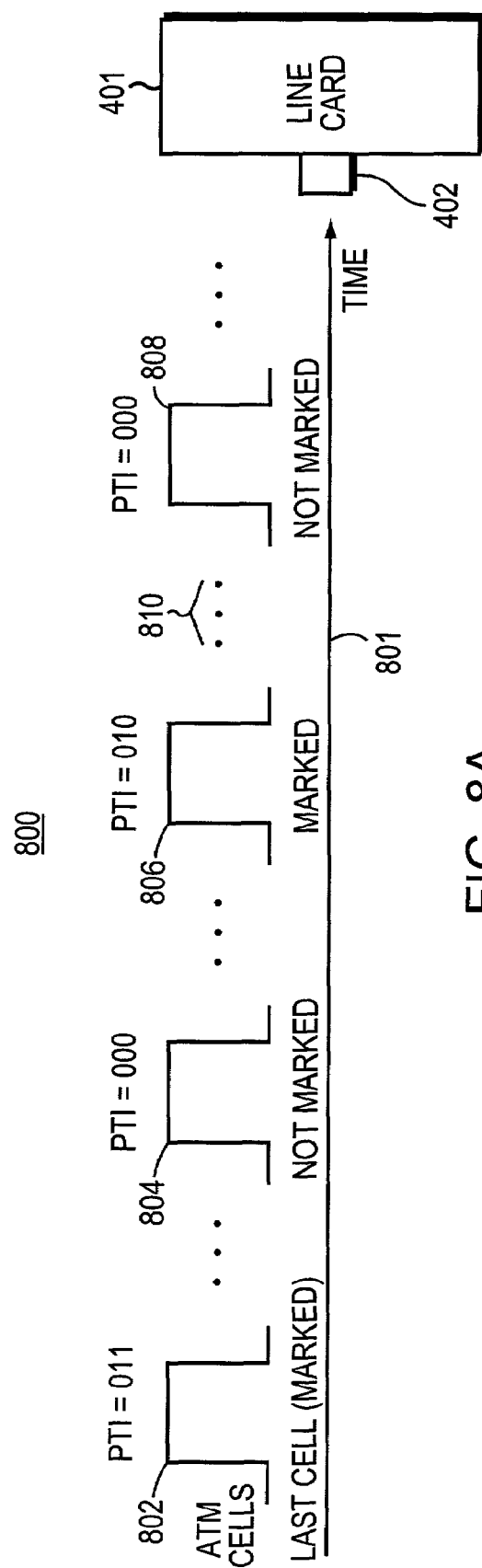
FIG. 8A is a timing diagram in accordance with the invention.

Turning now to FIG. 8A, a sequence of ATM cells reaching input port 402 of linecard 400 is shown as ATM cell sequence 800. ATM cell 802 has its PTI bits set to "011 ". ATM cell 804 has its PTI bits set to "000". ATM cell 806 has its PTI bits set to "010". ATM cell 808 has its PTI bits set to "000". Time of arrival of the ATM cells at port 402 is indicated by time line 801.

The first ATM cell to arrive in the drawing 800 is ATM cell 808, and it is a data ATM cell, as indicated by the PTI 0 bit having the value "0", it is not marked as having passed through a queue having its lower threshold exceeded by the value of its PTI 2 bit having the value "0", and it is not the last ATM cell of a packet as is indicated by the PTI 2 bit having the value "0".

Three dots 810 indicate that a large number of additional ATM cells may have arrived at port 402 of linecard 400. The next indicated ATM cell to arrive in linecard 400 is ATM cell 806, having its PTI bits having the values "010". Again, the PTI 0 bit having the value "0" indicates that the ATM cell is a user data ATM cell. The ATM cell is marked as having passed through a queue within the switching fabric 120 which is filled beyond its lower threshold value by the PTI 1 bit having the value "1 ". Again, the ATM cell is not the last ATM cell of a packet as is indicated by the PTI 2 bit having the value "0".

A still later arriving ATM cell 804 at port 402 of linecard 400 has its PTI bits set to the value "000", and so is a data ATM cell, is not "marked" as having passed through a queue filled above its lower threshold value, and is also not the last ATM data cell of a packet.

A still later arriving ATM cell 802 at port 402 of linecard 400 is indicated by ATM cell 802, and ATM cell 802 has its PTI bits set to the value "011". This ATM cell is also a user data ATM cell, it is marked as having passed the through a queue which was filled above its lower threshold value, by the value of the PTI 1 bit having the value "1". Also ATM cell 802 is the last ATM cell of a packet as the value of the PTI 2 bit having the value "1" indicates.

For each output port, the ratio of the number of the marked cells to the total number of cells arriving at an output port is computed by traffic manager 162. For example, the total number of ATM cells arriving during a specified time period destined for each output port may be counted. Also, for each output port, the number of ATM cells being "marked" as having passed through a queue whose filling exceeds its lower threshold value may be counted by monitoring the value of the PTI 1 bit, found in field 622. This per output port ratio may be computed at regularly timed intervals. For example, the "standardized" round trip time for the Internet is taken as 100 milliseconds, and this time period for computing the ratio has been found to be convenient. The time period is referred to hereinbelow as the "FREEZETIME". The ratio is computed by simply counting the number of ATM data cells arriving at each output port, and counting the number which have the PTI 1 bit of field 622 set to value "1". This ratio is computed for each and every output port, for example, at a FREEZETME of every 100 milliseconds in the present exemplary embodiment of the invention. This calculation is performed by traffic manager 162.

The ratio may be calculated for different flows. A flow may be defined by any combination fields read from the ATM cell header. Thus flows with a higher priority indicated by bits set in the ATM cell header may be treated to an algorithm which drops fewer of them, etc.

Figure 8B:
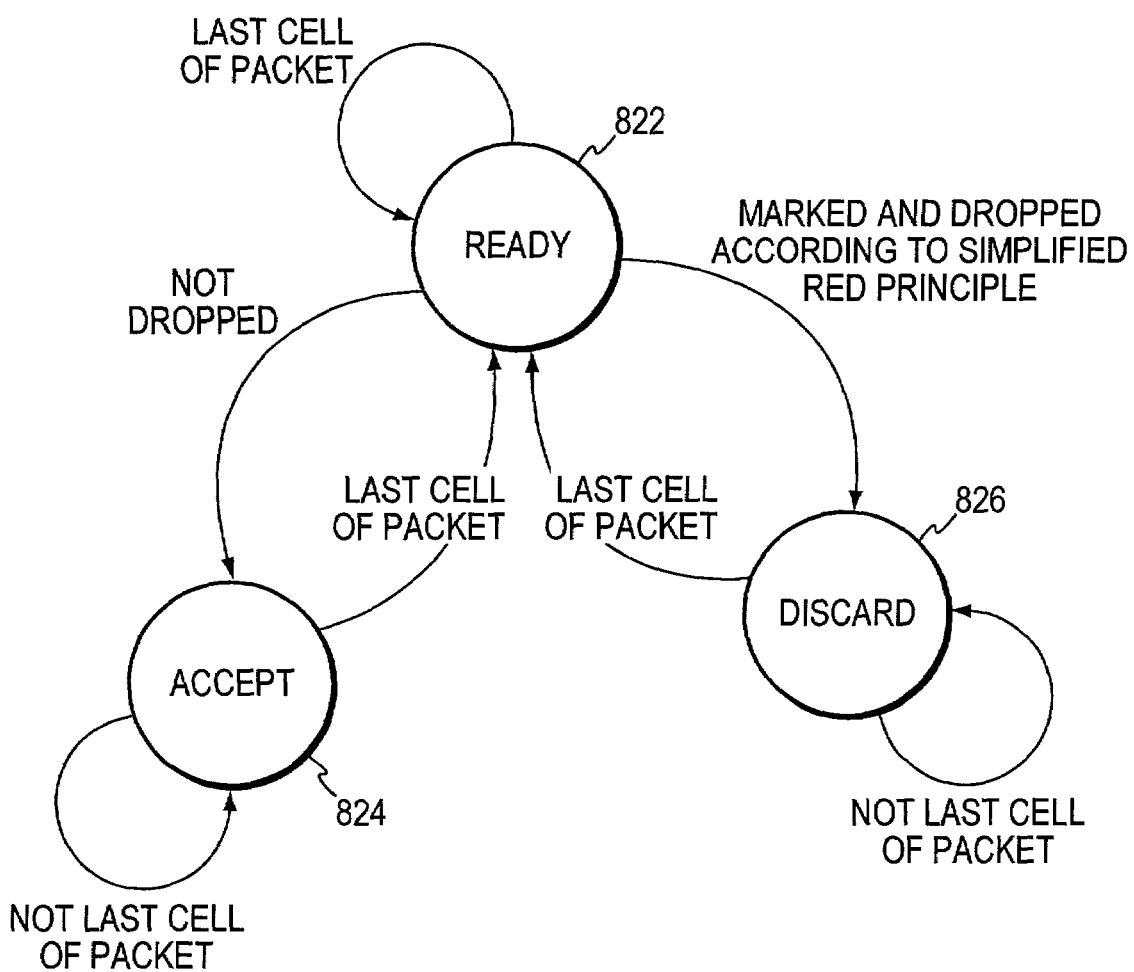
FIG. 8B is a state diagram in accordance with the invention.

Turning now to FIG. 8B, a virtual circuit (VC) state diagram 820 for the invention is shown. The VC state diagram defines the state transitions of a VC's state. A VC can be in one of three states: READY, ACCEPT, or DISCARD. A state transition is triggered by the arrival of a cell. When a VC is in the READY state, the cell that arrives is the first cell of an TCP/IP packet. Depending on the EFCI marking and the discard decision, the state transitions to ACCEPT or DISCARD. When a VC is in the ACCEPT state, arriving cells for the VC are admitted into the switch. A state transition from ACCEPT to the READY state is made when the last cell of a packet arrives. When a VC is in the DISCARD state, all incoming cells for the VC are dropped. Similarly, when the last cell of a packet arrives (and is dropped) the state transitions from DISCARD to the READY state. Accordingly, entire packets are admitted or dropped from the switch fabric based on the Simplified RED principle of the invention. The Pseudo Code which follows implements the state diagram.

At state 822 the state diagram is ready to receive the next ATM data cell, referred to hereinafter as the "current ATM cell". In the event that the current ATM cell is marked and dropped in accordance with the simplified RED principle, the state machine 820 transitions to discard state 826. In discard state 826 each successively received ATM data cell is checked to determine if it is "not the last cell of a packet" by testing the PTI2 bit in field 624. In the event that the ATM data cell is not the last cell of a packet, the cell is discarded, as an earlier cell of the packet was discarded and there is no point in retaining additional cells of a packet which will ultimately be discarded. In the event that a ATM data cell tests as the last cell of a packet, that is the PTI2 bit of field 624 is "set", then the cell is discarded and state machine 820 transitions to ready state 822.

In the event that an ATM data cell tests at ready state 822 as "not dropped" by the simplified RED principle, the state machine 824 transitions to accept state 824, and the ATM data cell is accepted and forwarded. The state machine 820 remains in accept state 824 until a last cell of a packet is detected by a test of the PTI2 bit of field 624. Upon detection of the last cell of a packet, the cell is accepted and the state machine 820 transitions to ready state 822. In ready state 822 the state machine waits for the first ATM data cell of the next TCP/IP packet.

Figure 9:
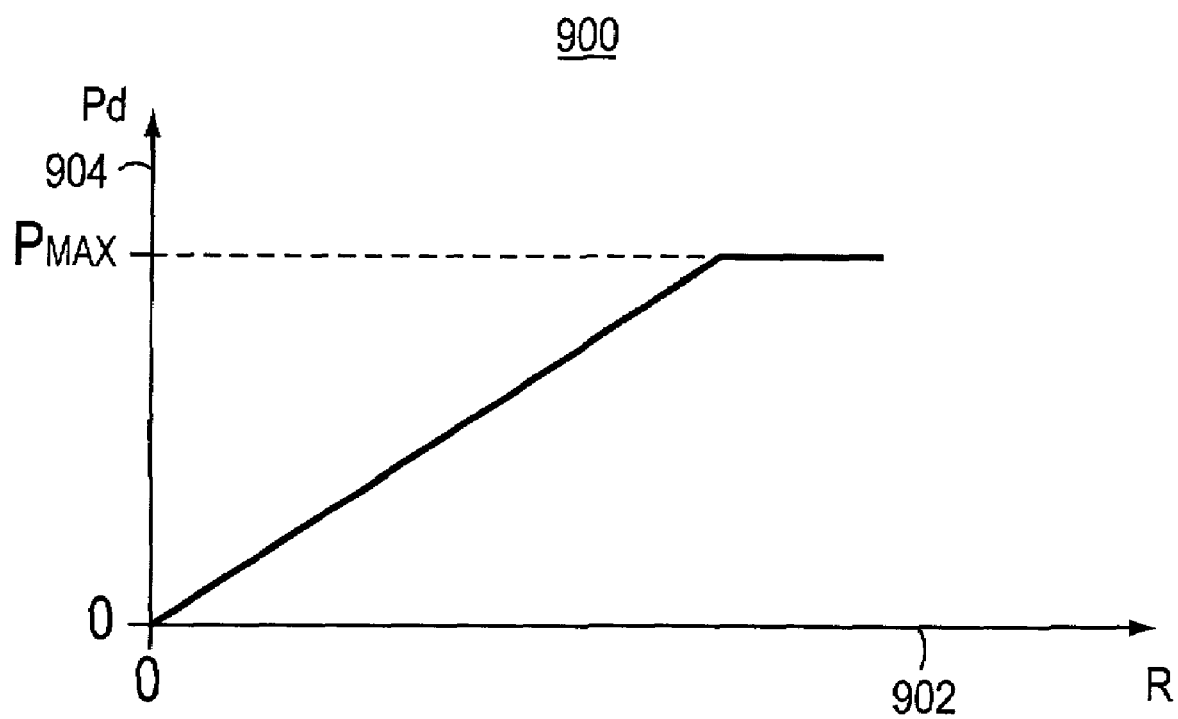
FIG. 9 is a graph of a control law in accordance with the invention.

Turning now to FIG. 9, a random selection calculation for use in a RED algorithm is shown. The periodically calculated value of the ratio "R" of the number of marked ATM cells received by an output port to the total number of ATM cells received by the output port during a chosen time period is shown plotted along the horizontal axis 902. The probability "Pd" that a packet should be discarded is plotted along the vertical axis 904. The graph of FIG. 9 is used to illustrate the calculation of the discard probability from the periodically measured value of R.

The discard probability Pd is calculated from the total number of ATM cells received by the port Nt, and the number of marked ATM cells received by the port Ne, as follows:

$$Pd = Pmax * (Ne/Nt)$$

"Pmax" is a parameter chosen by a person. The largest value which Pmax can have is 1.0, which would make Pd equal to unity in the event that all ATM cells received are marked.

The ratio R is calculated periodically by $$R = Ne/Nt$$

A random number is then chosen between 0 and 1.0. The value of Pd calculated above is then compared with the random number. In the event that the calculated value of Pd exceeds the random number, the ATM data cell is discarded.

Additional parameters may be used to choose the packet to be discarded. For example, a class of service may be indicated by a bit in the packet, and preference given to transmission of packets with one class rather than another class. Also, flows may be identified by the packet source address and destination address, or by other parameters in the packet header. The probability of discarding a packet may then be influenced by the flow, as well as by other parameters carried in the packet header, as read by header read logic 160.

Pseudo Code
    Define:
        VC_state[k]: the state of VC[k], where k is the VC's ID
        Nt[i][j]: total number of packets for port i and class j
        Ne[i][j]: number of EFCI-marked cells for port i and class j
        PD[i][U]: Packet Drop probability for port i and class j
        MaxP[j]: Maximum Packet Drop probability for class j
        FREEZETIME: 100 msec
        Last_adjust_time[i]: last time Pd adjustment was made for port i
Initialize
for all k, VC_state[k]=READY
for all i & j, Nt[i][j]=NE[i][j]=0
Algorithm:
Receiving an incoming cell with VC ID=k, output port=i, Class=j
    Nt[i][j]++
    If (cell is marked) Ne[i][j]++
    If (VC_state[k]=READY {
        If (cell is marked AND random ( ))<
            discard_Probability[i][j] {
            discard cell
            VC_state[k]=DISCARD}
        } else {
            accept cell
            VC_state[k]=ACCEPT
        }
        if (cell is last cell in packet) VC_state=READY
    } else {
    if (VC_state[k]=READY) {
        accept cell
        if (cell is last cell in packet) VC_state[k]=READY
        else VC_state[k]=ACCEPT
    } else {
        if (VC_state[k]=DISCARD) {
        discard cell
        if (cell is last cell in packet) VC_state[k]=READY
        else VC_state[k]=DISCARD}
        }
    }
}

```
if(now−last_adjust_time[i]>100msec){
    Discard_Probability [i][j]=Ne [i][j]/Nt[i][j]*Max_P
        [j]
    Ne[i][j]=0
    Nt[i][j]=0
}
```

Efficient Implementation of RED

The computation of the probability of dropping a packet, Pd in the RED algorithm may be efficiently implemented in accordance with the following computational scheme.

An efficient computation of Pd=Ne/Nt*MaxP is given below. This computation may be efficiently implemented in hardware logic circuitry in a chip.
   initialize M (1) multiply Ne by M, (let x=Ne*M)

(2) compute the value "index", where index=div(x), and where the integer divide function div ( ) can be implemented as,
```
   div(n){
   int i;
   for (i=0; i<infinity; i++){
      n=n−Nt;
      if (n<=0) break;
   }
   return(i);
   }
```

(3) Pd=table[index], where the i-th table entry is initialized by table[i]=i/M*MaxP;

The ease of implementing the above computation in hardware is shown by the following. Note that in this implementation, (i) if M=2⊙m (that is M=2 raised to the m-th power), only shift operations are needed, and (ii) truncation error for Ne/Nt is at most 1/M (e.g., M=16, error<6%, M=32, error<3%). This computation may be implemented by logic gates, for example in an application specific integrated circuit (an ASIC chip), or any other convenient implementation of hardwired logic gates or logic circuits.

Performance Simulations

Figure 10:
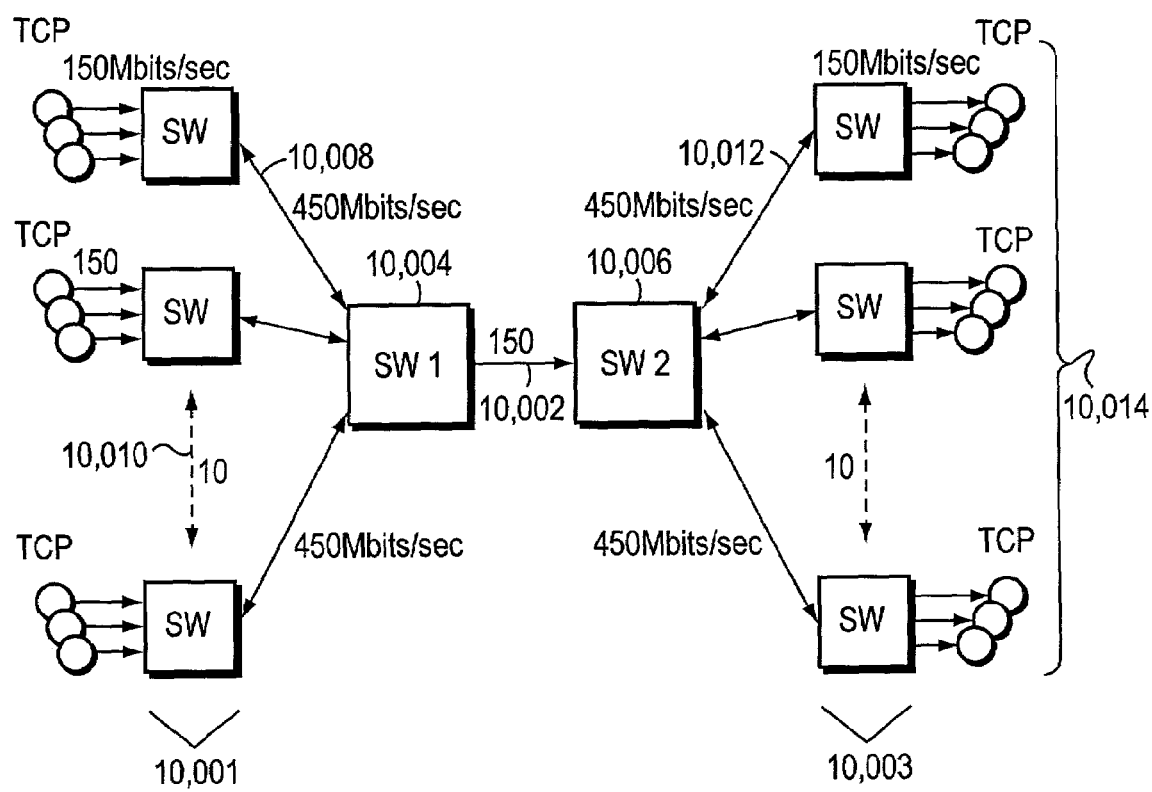
FIG. 10 is a topology used for simulation in accordance with the invention.

The performance of the present invention in a simulated congested network is examined. For example, an ATM switching fabric using ATM cells for the ATM cells is assumed. FIG. 10 shows the topology of the simulated network. A total of 30 transmission control protocol (TCP) connections are aggregated into a single network device, such as network device 100 shown in FIG. 1, and then through a link to another similar network device.

Three TCP/IP connections are aggregated into each of the front end switches 10,001. The front end switches are connected by links such as link 10,008 to network device 10,004. Network device 10,004 is an example of network device 100 shown in FIG. 1. All of the connections traverse and inter-switch link 10,002 between network device 10,004 and network device 10,006. This connection creates a bottleneck output port in network device 10,004. The connections are aggregated in such a way as to create three (3) TCP/IP "transmission control protocol" connections per input port of network device 10,004. A queue is maintained at the output port of network device 10,004 to link 10,002 for each input port of network device 10,004.

Consequently, each ten (10) per-port input queues at the congested output port on network device 10,004 contains 3 TCP/IP flows. Each of the ten (10) per-port input queues were configured with a lower threshold 312A, 314A, 316A, etc., that is an EFCI marking threshold. Each of the input queues also were configured with and an upper threshold 312B, 314B, 316B, etc., that is a Max threshold. When the queue level (length) exceeds the EFCI marking threshold the incoming data cell is marked by setting the PTI 1 bit in field 622 to the value "1". When the queue level (length) exceeds the Max threshold, the incoming packet is dropped.

Each TCP connection is fed by an infinite data source. Switches 10,001, 10,003, etc. convert TCP/IP packets into ATM cells, and launch the ATM cells onto links 10,008, and link 10,012, etc. Switch 10,004 and switch 10,006 are ATM switches as, for example, indicated in FIG. 2 as ATM switch 202 and ATM switch 204. Link 10,002 carries ATM cell traffic. ATM switch 10,004 and ATM switch 10,006, along with their inter-connecting link 10,002 are congested. Cell discard occurs within the structure of ATM switch 10,004, 10,006 and ATM link 10,002.

The link speeds are as marked in FIG. 10. Each of the TCP/IP inputs to switches 10,001 are at 150 megabits per second. Link 10,008 is a 450 megabit per second link, as are the other input links to network device 10,004. Dotted lines 10,010 show that 10 input linecards, each having 3 TCP connections of 150 megabits per second are connected to network device 10,004.

The inter network device link 10,002 is shown with a 150 megabit per second capacity. Downstream network device 10,006 also has connected thereto 10 front end switches 10,003 each connected to 3 ports, where the ports operate at 150 megabits per second bandwidth, and the links, for example, link 10,012 operate at 450 megabits per second. There are ten front end switches 10,003 connected to network device 10,006 by 450 megabit per second links, for example link 10,012. Each front end switch 10,003 delivers packets to three (3) TCP/IP receiver stations 10,014.

The delay across the inter-switch link 10,002 was set at 25 milliseconds to simulate a typical wide area network scenario. The packet size in the TCP connections is 1024 bytes in length.

A result is that the maximum throughput which could be achieved in this simulation on the congested link 10,002 is approximately 138 megabits per second.

A number of scenarios with various combination of: lower threshold settings, that is EFCI marking; various upper threshold settings, that is Max thresholds; and, various values of Pd update intervals were simulated. The results can be summarized in three (3) cases described herein below. For comparison purpose, two (2) scenarios in which only the upper threshold mechanism was used were also simulated.

Before examining the performance of the RED algorithm as presented in the present invention, it is instructive to look at the performance of the network with the RED computation disabled. That is only the upper threshold mechanism is enabled. In this case, when a queue's Max threshold is reached, incoming packets are discarded.

Turning now to FIG. 11 (A–D) the case of using only a Max threshold mechanism is shown. FIG. 11A and FIG. 11B show the results for the case with Max threshold of 300 cells and no RED algorithm. FIG. 11A plots the received packet sequence of the 30 connections, with only a few representative sequences sketched. FIG. 11B plots the aggregate queue length (sum of all per-input queues) of the congested port. The small queue build up and long periods of empty/near empty queue indicates that the link is under utilized. The measured throughput is 124.7 megabits per second or 90% of the link bandwidth.

Figure 11A:
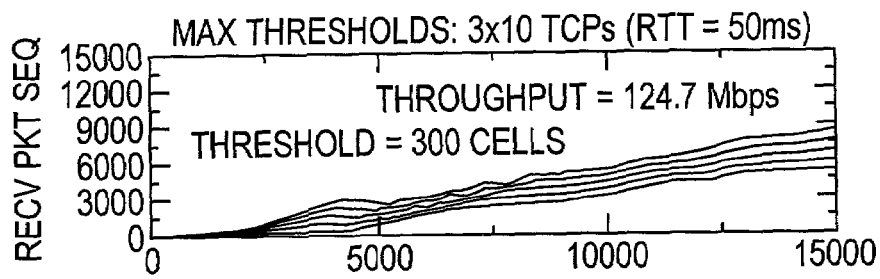
FIGS. 11A–11D are graphs of a simulation in accordance with the invention.
Figure 11B:
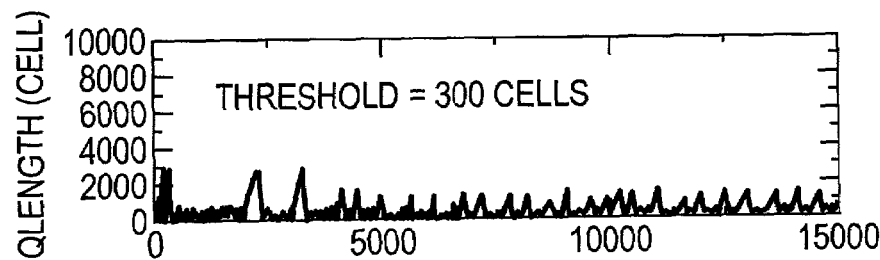
Figure 11C:
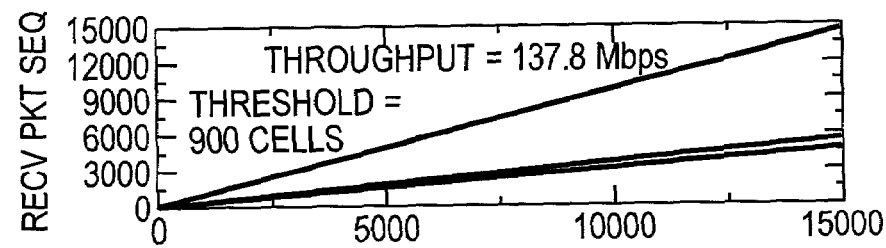
Figure 11D:
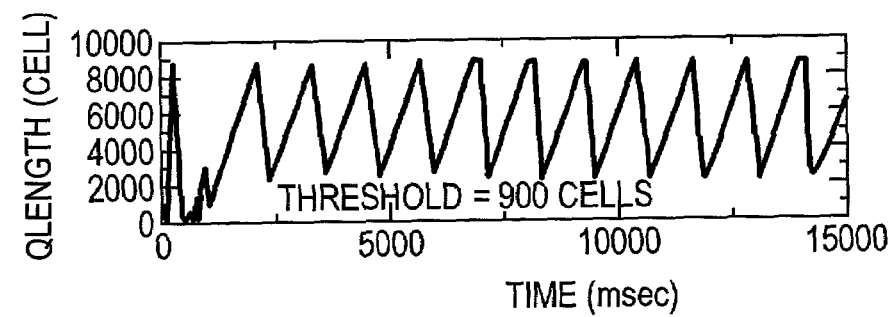
Figure 12A:
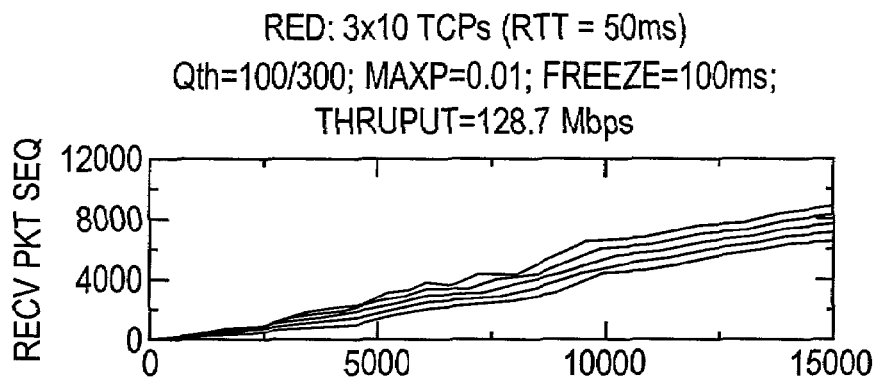
FIGS. 12A–12D are graphs of a simulation in accordance with the invention.
Figure 12B:
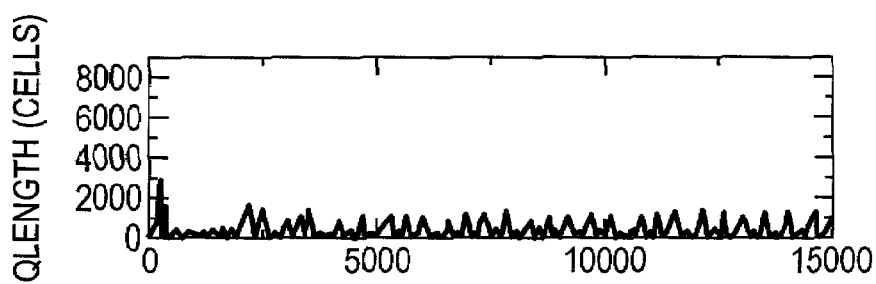
Figure 12C:
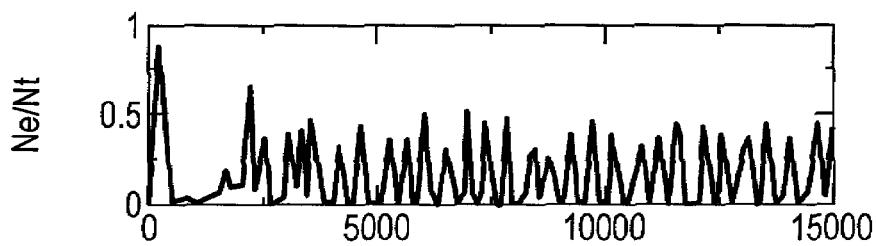
Figure 12D:
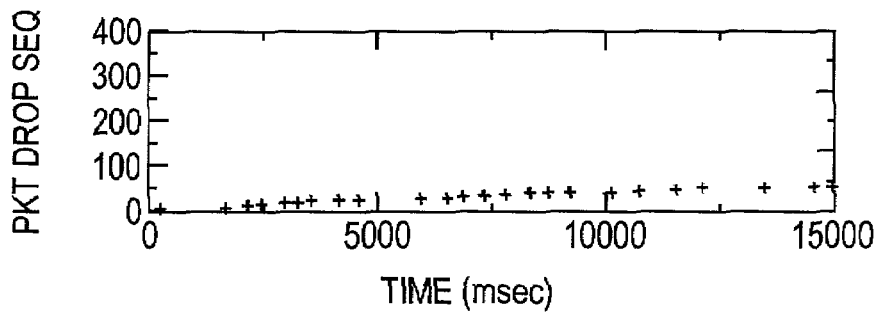

FIG. 11C and FIG. 11D show the results when the Max threshold is increased from 300 to 900 cells. From FIG. 11D, it can be observed that the congested link is now fully utilized, since the aggregate queue is always non-empty. However, the queue oscillates sharply between 2,000 and 9,000 ATM cells. Oscillatory behavior is indicative of unwanted synchronization among a number of TCP sources. Furthermore, FIG. 11C shows that fairness among the connections is very poor. One group of connections grabbed more than twice the bandwidth than another group of connections.

Turning now to FIG. 12 (A–D), a case using the RED algorithm with the ratio of EFCI marked cells to total cells received is shown. FIG. 12 (A–D) gives results for parameter settings of: EFCI-threshold=100 cells, and Max-threshold=300 cells. FIG. 12A shows the received packet sequence of the thirty (30) TCP connections, with only a few representative connections sketched. The total throughput of all the connections is calculated at 128.7 megabits per second, or 93% link bandwidth. FIG. 12B shows the aggregate queue length at the congested output port. FIG. 12C plots the ratio of Ne/Nt versus time. It can be observed that the ratio tracks the aggregate queue length quite well. FIG. 4D plots the drop sequence number of all the dropped packets. Note that only a small number of packets were dropped. Dropping only a small number of packets indicates that most of the dropped packets were dropped by the upper threshold mechanism.

The results of this scenario are very similar to those shown in FIG. 11A and FIG. 11B. Thus, we can conclude that if the Max threshold is set too low, the benefits of the RED computation cannot be realized, as the upper threshold mechanism dominates the packet drop.

Turning now to FIG. 13 (A–D), a further case using the RED algorithm with the ratio of EFCI marked cells to total cells received is shown. FIG. 13 (A–D) gives results for parameter settings of: EFCI-threshold=300 cells, and Max-threshold=900 cells.

Figure 13A:
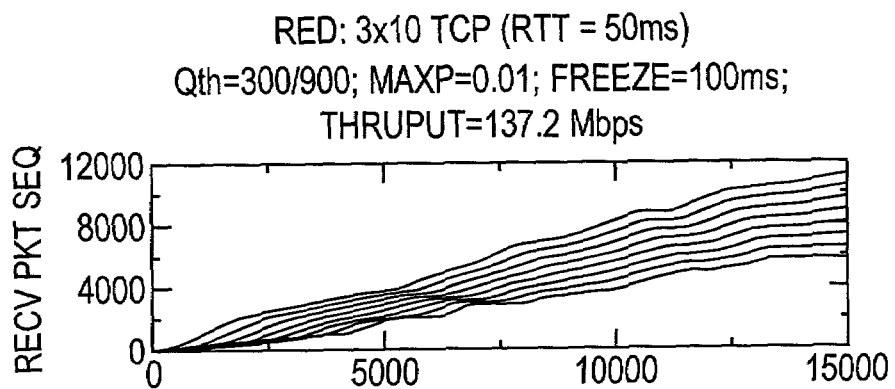
FIGS. 13A–13D are graphs of a simulation in accordance with the invention.
Figure 13B:
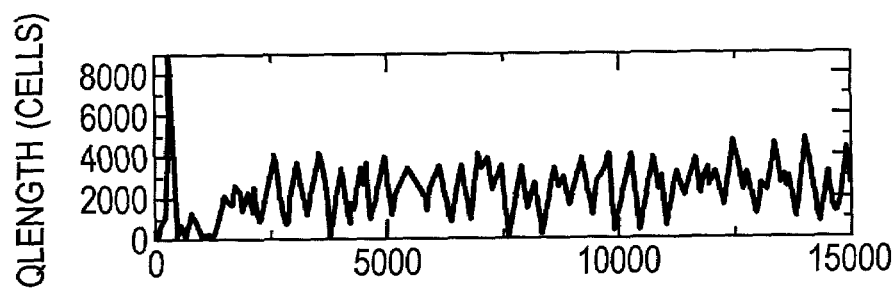
Figure 13C:
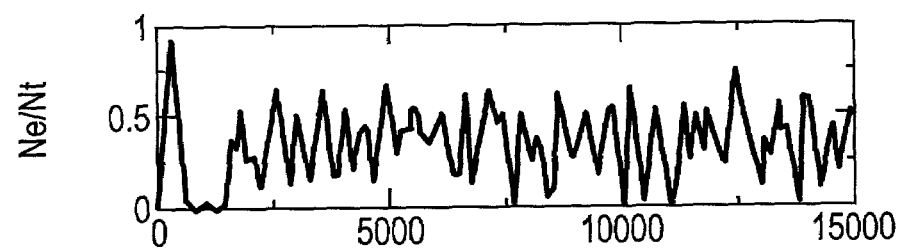
Figure 13D:
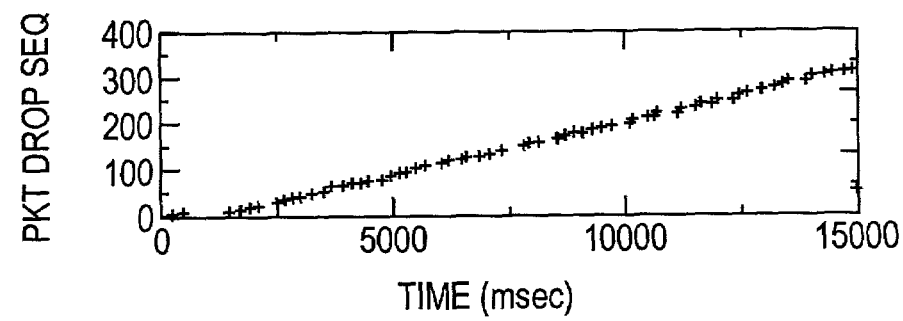
Figure 14A:
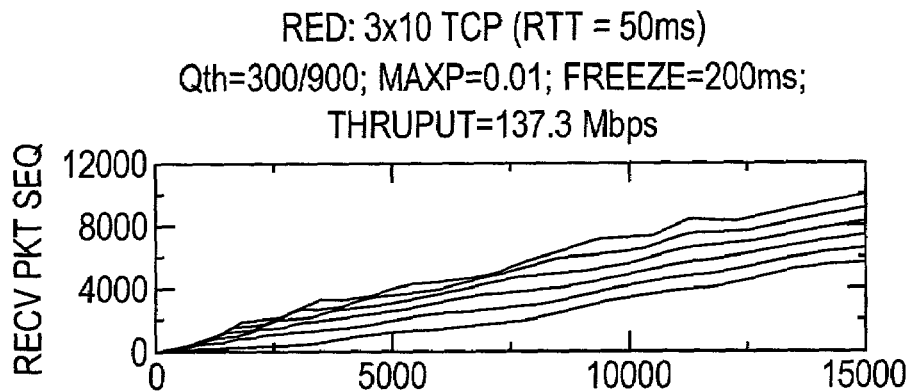
FIG. 14A–FIG. 14D are graphs of a simulation in accordance with the invention.
Figure 14B:
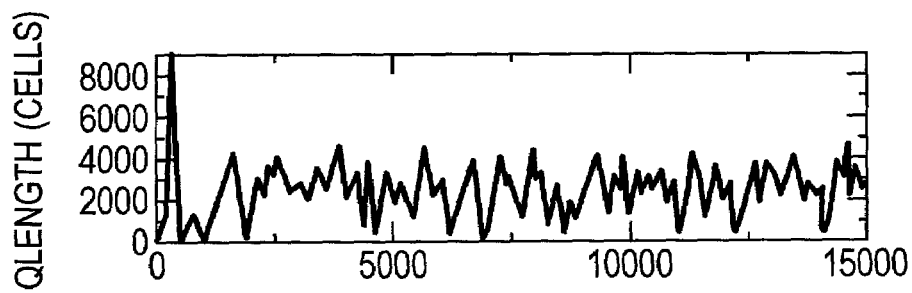
Figure 14C:
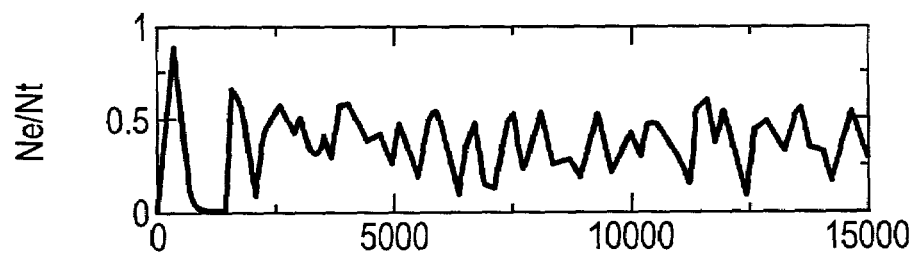
Figure 14D:
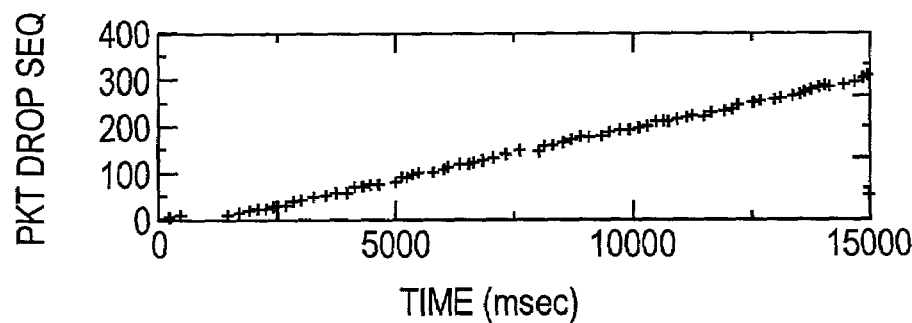

FIG. 13A shows the received packet sequence of the thirty (30) TCP connections, with only a few representative connections sketched. FIG. 13B shows that the congested link is very near being 100% utilized. FIG. 13C shows that Ne/Nt tracks the aggregate queue length very closely. FIG. 13D shows that a fair amount of packets is being discarded by the RED mechanism. The effect of the RED mechanism can be seen by comparing FIG. 13B with FIG. 11D. In FIG. 11D the aggregate queue length exhibits large oscillations due to TCP synchronization, whereas in FIG. 13B the RED algorithm functions to randomly drop packets from different connections, and thereby avoids TCP synchronization.

Effects of Pd Update Intervals

Turning now to FIG. 14 (A–D), the simulation results of changing the value of FREEZETIME, the update time interval for calculating the value of Pd are shown. The scenario of FIG. 13 (EFCI threshold=300 cells, Max threshold=900 cells) was repeated, with the update interval increased to 200 milliseconds. The results are plotted in FIG. 14A through FIG. 14D. It can be observed that the only noticeable difference from the FIG. 13 (A–D) results for FREEZETIME=100 milliseconds is the ratio Ne/Nt shown in FIG. 14C. Although the ratio still tracks the aggregate queue length quite well, the graph of FIG. 14C is a "smoother" curve compared with the graph shown in FIG. 13C. This observation is understandable, since a larger measurement interval tends to absorbs the small fluctuations in queue length. Thus the effect of increasing the update interval in the RED algorithm tends to smooth variations in the computed parameter.

Effects of MaxP

The parameter MaxP in the RED algorithm was varied and simulations run. The simulations show that a small value in the range from 0.5 to 2% is preferable. A value of 1% was used for the results presented herein.

Multiple Drop Preference

Service classes with different drop preferences were simulated. Different IP classes of service were established by configuration. Different classes of service are stored in different queues in the switching fabric. For example, up to four classes could be defined in the simulation. The CLP bit in the standard ATM cell header is used to establish preferences as the cell passes through the ATM switching fabric.

The RED algorithm can easily handle multiple drop preferences within each class. By configuring different MaxPs and/or Ne/Nt for each drop preference, throughput differentiation for connections with different drop preferences were studied.

In this discussion, two options are examined: (1) using per-class Ne/Nt, and (2) using per-class per preference Ne/Nt. Both options used per preference MaxPs, as described next.

First, the per-class Ne/Nt option is discussed. In this option only one ratio of Ne/Nt per-class was maintained. Throughput differentiation is achieved by configuring different MaxPs for each drop preference. This is the simplest option to implement.

Next the per-class per-reference Ne/Nt Option is discussed. In this option, a ratio of Ne/Nt is maintained per-class per-preference. Let Ne0 and Ne1 denote the number of marked ATM cells (EFCI-marked ATM cells in the simulation) with drop preference 0 and 1, respectively, and Nt0 and Nt1 the total number of ATM cells with drop preference 0 and 1.

Also let:

$$Ne0+1=Ne0+Ne1, \text{ and}$$

$$Nt0+1=Nt0+Nt1.$$

Let Pd0 and Pd1 denote the drop probabilities of ATM cells with preferences 0 and 1.

Pd0 and Pd1 are computed by, $$Pd0=(Ne0/Nt0+1)*MaxP0$$

$$Pd1=(Ne0+1/Nt0+1)*MaxP1$$

That is, the drop probability of the higher preference ATM cells (preference 0) is proportional to the number of marked ATM cells (EFCI-marked ATM cells) of its preference level only, whereas the drop probability of the lower preference Pd1 is proportional to the sum of the number of marked ATM cells of both its preference level and those of higher preference levels. A result of this option is that the drop probability for each preference level is now also dependent on the relative traffic loads of each traffic type. In particular, the smaller the load for a higher preference level is, the lower its drop probability. By correlating the drop probability with the traffic load, better throughput differentiation can be achieved. The following examples serve to illustrate this effect.

EXAMPLE 1

Assume 500 cells of each preference level are received from the switching matrix by the output port. Also assume that half of all cells are marked. Since the preference level is transparent to the marking mechanism, the fraction of marked cells and each preference level is the same (50%). Then:

$Ne0/Nt0+1=250/10000=0.25$, and $Ne0+1/Nt0+1=500/1000=0.5$.

Thus, in addition to MaxPs, the drop probability Pd0 is further reduced by 50% relative to Pd1.

EXAMPLE 2

Assume 100 and 900 cells of preference level 0 and 1, respectively are received. Assume, as before, that half of all cells are marked. Then:

$Ne0/Nt0+1=0.05$ and, $Ne0+1/Nt0+1=0.5$.

Consequently, the drop probability Pd0 of the preferred class is further scaled down by a factor of 10 relative to the less preferred class drop probability Pd1.

Simulations of Per-class and Per-Class Per Preference Options.

Turning now to FIG. 15 (A–D), simulation results for per class and per class preferences are shown. Simulation results for the two options, per-class and per-class per-preference values of Ne/Nt are presented. The topology simulated is the same as shown in FIG. 10. To introduce traffic of different preference levels, one in each of the three TCP connections going into a first stage switch 10,001 as shown in FIG. 10, is classified as preference 0, with the other two connections preference 1. Thus a total of 10 connections are of preference 0, and 20 connections are of preference 1. A number of different combinations of MaxP0 and MaxP1 were simulated.

Figure 15A:
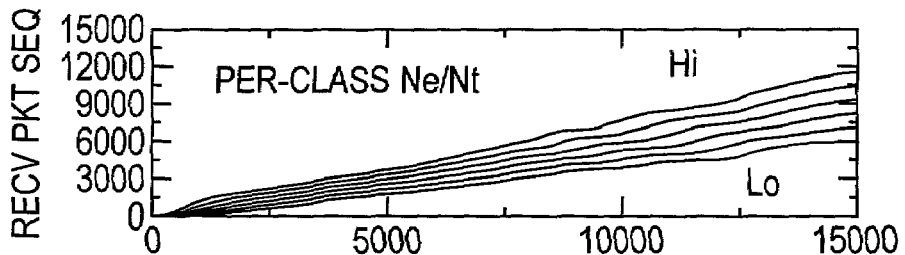
FIG. 15A–FIG. 15D are graphs of a simulation in accordance with the invention.
Figure 15B:
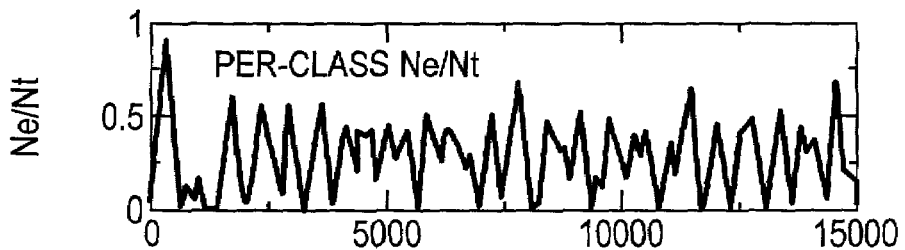

FIG. 15A through FIG. 15D show the received packet sequence and the Ne/Nt plots for both the per-class Ne/Nt and the per-class per-preference Ne/Nt options. MaxP0 and MaxP1 are set to 1.0% and 2.0%, respectively. FIG. 15A shows the received packet sequence of the thirty (30) connections for the per class Ne/Nt option. While the 10 high preference connections achieved higher throughput than the 20 lower preference connections, the distribution of the bandwidth among the connections is less than optimal.

Figure 15C:
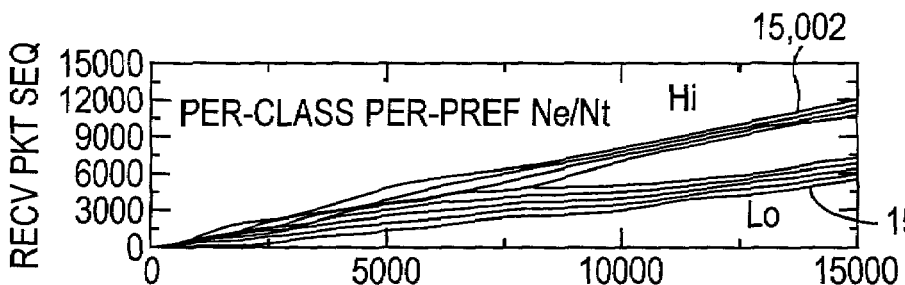

FIG. 15C shows the corresponding results for the per-class per-preference Ne/Nt option. The high preference packets received by the bottleneck port of network device 10,004 to inter-switch link 150 are shown in graph 15,002, while the number of low preference packets received are shown in graph 15,004. Comparing FIG. 15A and FIG. 15C, we can clearly see that throughput differentiation is more pronounced for the per-class per-preference Ne/Nt than for the per-class Ne/Nt option.

Figure 15D:
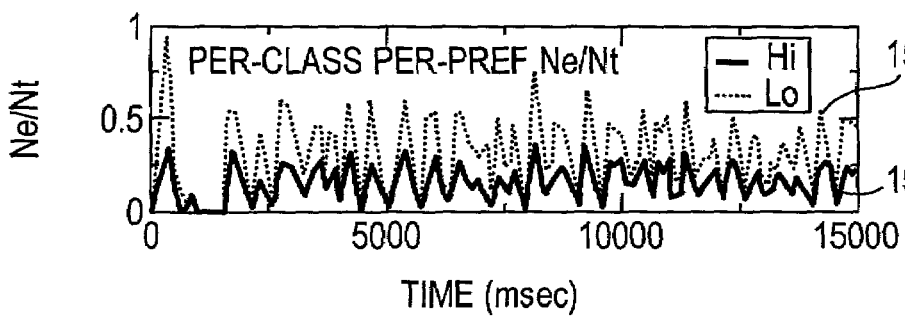

FIG. 15D shows the value of Ne/Nt for high preference traffic in graph 15,008, and shows corresponding values for low preference traffic in graph 15,006. FIG. 15D shows that more packets of low preference traffic (graph 15,006) are dropped than are dropped for high preference traffic (graph 15,008).

Simulations using various combinations of MaxP0 and MaxP1, also support the above observation. Therefore, it is concluded that the per-class per-preference option provides a more preferable distribution of bandwidth.

A key ingredient in the present invention of the use of the RED algorithm is the use of the number of marked ATM cells which are marked by the switching fabric as an indicator of the degree of port congestion. The RED algorithm as described herein requires minimum computing resources and can thus be implemented in an ASIC chip such as chip 404, or in a logic circuits 406, mounted on a linecard of a network device 100. Alternatively, logic circuits 406 may be replaced by a microprocessor, and the invention implemented in code executing in the microprocessor. Simulation results show that the invention performs quite well for the scenario studied as described here and above. Further, the invention works well in differentiating throughput for different classes of traffic. Simulation shows that throughput differentiation can be achieved for different classes of traffic by the present invention.

It is to be understood that the above-described embodiments are simply illustrative of the principles of the invention. Various other modifications and changes may be made by those skilled in the art which embodied the principles of the invention and fall within the spirit and scope thereof.

What is claimed is:

1. A switch for a computer network, the switch to receive ATM cells from the computer network, comprising:
   a switching fabric to receive a cell at an input port, said switching fabric selecting a route there-through for said cell to an output port;
   at least one queue within said switching fabric, said queue having an associated threshold, said switching fabric to determine the number of cells present in said queue, said switching fabric further configured to determine if the next arriving cell for said at least one queue fills said queue above said threshold, and in the event that said at least one queue is filled above said threshold, then write a flag bit within said cell to a "set" state; and
   a traffic manager to compute a ratio of cells having said flag bit set to a total number of cells received at an output port, and in response to a value of said ratio, either discard said cell or forward said cell onto an output link of said computer network, said traffic manager to select a cell to be discarded on a random basis and absent access to the number of cells present in the at least one queue.

2. The switch of claim 1 further comprising:
   an ASIC chip having said traffic manager implemented therein.

3. The switch of claim 1 wherein said flag bit further comprises:
   an EFCI bit of said ATM cell.

4. The switch of claim 1 further comprising:
   a switch fabric card, said switch fabric card having switching fabric chips and said traffic manager mounted thereon.

5. The switch of claim 1 further comprising:
   an IP linecard, said IP linecard configured to receive TCP/IP computer packets from a computer network and forward ATM cells to said switching fabric.

6. The switch of claim 1 further comprising:
   an IP linecard, said IP linecard configured to receive ATM cells from said switching fabric and forward TCP/IP computer packets onto a computer network.

7. A switch for a computer network, the switch to receive IP packets from the computer network, comprising:
   a line card to convert said IP packets to fixed length segments;
   a switching fabric to receive said fixed length segments from said line card at an input port, said switching fabric to select a route there-through for said fixed length segment to an output port;

at least one queue within said switching fabric, said queue having an associated threshold, said switching fabric to determine the number of fixed length segments present in said queue, said switching fabric configured to determine if the next arriving fixed length segment for said at least one queue fills said queue above said threshold, and in the event that said at least one queue is filled above said threshold, then write a flag bit within said fixed length segment to a "set" state;

a traffic manager to compute a ratio of fixed length segments having said flag bit set to a total number of fixed length segments received at an output port, and in response to a value of said ratio either discard said fixed length segment or forward said fixed length segment onto an output link of said computer network, said traffic manager to select a fixed length segment to be discarded on a random basis and absent access to the number of cells present in the at least one queue.

8. The switch as in claim 7 further comprising:
said fixed length segment is an ATM cell and said flag bit is an EFCI bit of said ATM cell.

9. A switch for a computer network, the switch to receive data cells from the computer network, comprising:
a switching fabric to receive a cell at an input port, said switching fabric configured to select a route there-through for said cell to an output port;

at least one queue within said switching fabric, said queue having an associated threshold, said switching fabric to determine the number of cells present in said queue, said switching fabric to determine if the next arriving cell for said at least one queue fills said queue above said threshold, and in the event that said at least one queue is filled above said threshold, then write a flag bit within said cell to a "set" state;

means for computing a ratio of cells having said flag bit set to a total number of cells received at an output port, and in response to a value of said ratio either discarding said cell or forwarding said cell onto an output link of said computer network, said means to select a cell to be discarded on a random basis and absent access to the number of cells present in the at least one queue.

10. The switch as in claim 9 wherein said data cells further comprise ATM cells.

11. The switch as in claim 9 wherein said data cells further comprise fixed length data cells.

12. The switch as in claim 9 wherein said data cells further comprise IP cells.

13. A method of operating a network switch, said network switch receiving fixed length segments from a computer network, comprising:
receiving a fixed length segment at an input port of a switching fabric, said switching fabric selecting a route through said switching fabric from an input port to an output port of said switching fabric for said fixed length segment;

maintaining at least one queue of fixed length segments within said switching fabric, said queue having an associated threshold, determining the number of fixed length segments present in said queue, and determining if the next arriving fixed length segment for said at least one queue fills said queue above said threshold, and in the event that said at least one queue is filled above said threshold, then writing a flag bit within said fixed length segment to a "set" state;

computing a ratio of fixed length segments having said flag bit set to a total number of fixed length segments received at an output port, and in response to a value of said ratio either discarding said fixed length segment or forwarding said fixed length segment onto an output link of said computer network, said discarding step selecting a fixed length segment to be discarded on a random basis and absent access to the number of cells present in the at least one queue.

14. The method of claim 13 further comprising:
using as said fixed length segment an ATM cell, and using as said flag bit an EFCI bit of said ATM cell.

15. The method of claim 13 further comprising:
using a Random Early Detection (RED) computational method to select said fixed length segment to be discarded on a random basis.

16. A method of operating a network switch, said network switch receiving TCP/IP computer packets from a computer network, comprising:
converting said TCP/IP packets to fixed length packets, said switching fabric selecting a route through said switching fabric from an input port to an output port of said switching fabric for said fixed length segment;

maintaining at least one queue of fixed length segments within said switching fabric, said queue having an associated threshold, determining the number of fixed length segments present in said queue, and determining if the next arriving fixed length segment for said at least one queue fills said queue above said threshold, and in the event that said at least one queue is filled above said threshold, then writing a flag bit within said fixed length segment to a "set" state;

computing a ratio of fixed length segments having said flag bit set to a total number of fixed length segments received at an output port, and in response to a value of said ratio either discarding said fixed length segment or forwarding said fixed length segment onto an output link of said computer network, said discarding step selecting a fixed length segment to be discarded on a random basis and absent access to the number of cells present in the at least one queue.

17. The method of claim 16 further comprising:
using as said fixed length segment an ATM cell, and using as said flag bit an EFCI bit of said ATM cell.

18. The method of claim 16 further comprising:
using a Random Early Detection (RED) computational method to select said fixed length segment to be discarded on a random basis.

19. A computer readable media containing instructions for operating a network switch, said network switch receiving fixed length segments from a computer network, the instructions comprising instructions configured to:
receive a fixed length segment at an input port of a switching fabric, and to select a route through said switching fabric from an input port to an output port of said switching fabric for said fixed length segment;

maintain at least one queue of fixed length segments within said switching fabric, said queue having an associated threshold, determine the number of fixed length segments present in said queue, and determine if the next arriving fixed length segment for said at least one queue fills said queue above said threshold, and in the event that said at least one queue is filled above said threshold, then write a flag bit within said fixed length segment to a "set" state;

compute a ratio of fixed length segments having said flag bit set to a total number of fixed length segments received at an output port, and in response to a value of said ratio either discard said fixed length segment or forward said fixed length segment onto an output link of said computer network, said instructions configured to select fixed length segment to be discarded on a random basis and absent access to the number of cells present in the at least one queue.

20. Electromagnetic signals propagating on a computer network, said electromagnetic signals carrying information for operating a network switch, said network switch receiving fixed length segments from a computer network, the information comprising instruction configured to:

receive a fixed length segment at an input port of a switching fabric, and to select a route through said switching fabric from an input port to an output port of said switching fabric for said fixed length segment;

maintain at least one queue of fixed length segments within said switching fabric, said queue having an associated threshold, determine the number of fixed length segments present in said queue, and determine if the next arriving fixed length segment for said at least one queue fills said queue above said threshold, and in the event that said at least one queue is filled above said threshold, then write a flag bit within said fixed length segment to a "set" state;

compute a ratio of fixed length segments having said flag bit set to a total number of fixed length segments received at an output port, and in response to a value of said ratio either discard said fixed length segment or forward said fixed length segment onto an output link of said computer network, said instructions to select a fixed length segment to be discarded on a random basis and absent access to the number of cells present in the at least one queue.

21. An ATM switch for receiving ATM cells from a computer network, the ATM switch comprising:

a switching fabric to receive cells at an input port, the switching fabric configured to select a route for the cells to an output port;

a queue within the switching fabric, the queue having an associated threshold, the switching fabric to determine the number of cells present in the queue, the switching fabric further to determine that the queue is filled above the threshold and in response set congestion indicator fields within newly arrived cells at the switching fabric;

a traffic manager, external to the switching fabric, the traffic manager to monitor cells received at the output port and to discard cells, in response to a ratio of cells having the congestion indicator field set to a total number of cells; and wherein the number of cells present in the queue is inaccessible to the traffic manager.

22. The switch of claim 21 further comprising:

an ASIC chip having said traffic manager implemented therein.

23. The switch of claim 21 wherein the traffic manager is further configured to apply a Randon Early Detection (RED) algorithm to the ratio of cells having the congestion indicator field set to the total number of cells.

24. The switch of claim 21 wherein the traffic manager is further configured to calculate a discard probability from the ratio of cells having the congestion indicator field set to the total number of cells.

25. The switch of claim 24 wherein the traffic manager is further configured to compare the discard probability to a random number, and in response to the comparison, to determine whether a particular cell should be dropped.

26. The switch of claim 24 wherein the traffic manager is further configured to adjust the discard probability in response to a particular cell being of a particular class of traffic.

27. The switch of claim 21 wherein the ratio of cells having the congestion indicator field set to the total number of cells is determined for a selected time period.

28. A method comprising:

receiving cells at an input port of a switching fabric;

selecting a route for the cells to an output port of the switching fabric, the route passing through a queue;

determining the number of cells present in the queue, and if the queue is filled above a threshold setting a congestion indicator field within newly arrived cells;

monitoring cells received at the output port and deciding that cells should be discarded, in response to a ratio of cells having the congestion indicator field set to a total number of cells; and wherein the number of cells present in the queue is not accessed in the steps of monitoring and deciding.

29. The method of claim 28 wherein the step of deciding further comprises:

applying a Random Early Detection (RED) algorithm to the ratio of cells having the congestion indicator field set to the total number of cells.

30. The method of claim 28 wherein the step of deciding further comprises:

calculating a discard probability from the ratio of cells having the congestion indicator field set to the total number of cells.

31. The method of claim 30 wherein the step of deciding further comprises:

comparing the discard probability to a random number, and determining, in response to the comparison, whether a particular cell should be discarded.

32. The method of claim 30 wherein the step of deciding further comprises:

adjusting the probability value in response to a particular cell being of a certain class of traffic.

33. The method of claim 28 further comprising:

discarding cells by a line card.

* * * * *